(12) United States Patent
Boidin et al.

(10) Patent No.: US 7,616,309 B2
(45) Date of Patent: Nov. 10, 2009

(54) DEVICE FOR THE POSITIONING OF OPTICAL ELEMENTS WITH RETRACTABLE STOP

(75) Inventors: René Boidin, Fachesthumesnil (FR); Christophe Faveeuw, Dourges (FR); Emmanuel Froigneux, Villeneuve d'Ascq (FR)

(73) Assignee: Horiba Jobin Yvon S.A.S., Longjumeau Cedex (FR)

( * ) Notice: Subject to any disclaimer, the term of this patent is extended or adjusted under 35 U.S.C. 154(b) by 244 days.

(21) Appl. No.: 11/908,104

(22) PCT Filed: Mar. 10, 2006

(86) PCT No.: PCT/FR2006/050214

§ 371 (c)(1),
(2), (4) Date: Sep. 7, 2007

(87) PCT Pub. No.: WO2006/095116

PCT Pub. Date: Sep. 14, 2006

(65) Prior Publication Data

US 2008/0165441 A1    Jul. 10, 2008

(30) Foreign Application Priority Data

Mar. 10, 2005  (FR) .................................. 05 50630

(51) Int. Cl.
*G02B 7/00* (2006.01)
*G02B 7/16* (2006.01)
*G01J 3/06* (2006.01)
*G01J 3/18* (2006.01)

(52) U.S. Cl. ..................................... 356/328; 356/334
(58) Field of Classification Search ................. 356/326, 356/328, 334
See application file for complete search history.

(56) References Cited

U.S. PATENT DOCUMENTS

| | | | | |
|---|---|---|---|---|
| 3,822,941 | A * | 7/1974 | Roche et al. ................. | 356/334 |
| 4,866,477 | A * | 9/1989 | Barry et al. .................... | 355/55 |
| 5,280,338 | A * | 1/1994 | Drozdowicz et al. ......... | 356/328 |
| 5,767,965 | A * | 6/1998 | Zhou et al. .................. | 356/328 |

* cited by examiner

*Primary Examiner*—F. L Evans
(74) *Attorney, Agent, or Firm*—Brooks Kushman P.C.

(57) ABSTRACT

The invention relates to a device for the positioning of optical elements with retractable stop enabling accurate positioning of an optical element selected among a plurality of optical elements, including a stand (1); a turret fitted with a element holder and a disc (4), said disc (4) being a ratchet wheel having a peripheral surface (5) fitted with a plurality of blocking means (6), each blocking means (6) corresponding to an optical element, a motor (7) and a crash stop (9) bearing against the peripheral surface of the disc (5). According to the invention the stop (9) contains an anti-friction element (13) in contact with the peripheral surface (5) of the ratchet wheel so that the retractable stop (9) moves according to the contour of the peripheral surface (5) of the ratchet wheel without any friction.

12 Claims, 8 Drawing Sheets

DEVICE FOR THE POSITIONING OF OPTICAL ELEMENTS WITH RETRACTABLE STOP

The invention relates to a device for the positioning of optical elements with retractable stop enabling accurate positioning of one of at least two optical elements with great accuracy and a spectrometer incorporating said device.

By optical elements are meant elements such as diffraction grids, filters, mirrors, etc. . . requiring great accuracy for their orientation and a great stability once they are positioned.

These elements are used generally in spectrometric devices for Raman spectrometers or the like wherein one of these elements is oriented on the path of an incident optical beam.

Turret type devices such as those of the patents U.S. Pat. No. 5,280,338 and U.S. Pat. No. 5,767,965 are known which enable to select one of the optical elements supported by the turret in order to position it on a predetermined optical path.

This turret is mobile in rotation around an axis relative to a stand and enables to position one of the optical elements it carries. It is interconnected with a pinion driving it.

In the patent U.S. Pat. No. 5,767,965, the pinion includes blocking means on its peripheral surface which enable, using a blocking finger, to block the turret so that an optical beam is reflected on a selected optical element.

After multiple selections of optical elements and multiple blockages, the blocking device eventually exhibits a certain clearance due to the wear of the generally metallic parts, rubbing against one another.

The wear of the metallic parts is particularly cumbersome in optical devices since metallic particles are liable to settle on the optical elements, thereby compromising the measurement.

Additionally, the clearance in the blocking device generates lesser stability of the optical elements and consequently of the measurements by the spectrometers which are less accurate and less reproducible.

Thus, the object of the present invention is to provide a device for the positioning of optical elements with retractable stop enabling accurate positioning of one of at least two optical elements with great accuracy, without any possible clearance nor wear of the parts.

To this end, the invention relates to a device for the positioning of optical elements with retractable stop enabling accurate positioning of an optical element selected among a plurality of optical elements, including:
  a stand;
  a turret fitted with a element holder carrying said plurality of optical elements, and a disc integral with the element holder, said disc being a ratchet wheel having a peripheral surface fitted with a plurality of blocking means, each blocking means corresponding to an optical element,
  a motor capable of driving said disc rotatably around a first axis in a so-called forward direction and in a reverse direction; and,
  a crash stop bearing against the peripheral surface of the disc and capable of retracting by moving around a second axis when actuating said motor for driving the disc in the forward direction, said crash stop being capable of engaging with a blocking means, so as to block said disc in position when actuating the motor for driving the disc in the opposite direction.

According to the invention, the crash stop includes an anti-friction element in contact with the peripheral surface of the ratchet wheel so that the retractable stop moves according to the contour of the peripheral surface of the ratchet wheel without any friction.

In different possible embodiments, the present invention also relates to the following features which may be considered individually or in all their technically possible combinations and each providing specific advantages:
  the anti-friction element is a caster free to rotate around an axis,
  the blocking means of the ratchet wheel include a recess in the form of a semi-cylinder, capable of enabling the nesting of said caster in said recess when the disc is in blocked position,
  the crash stop includes a contact semi-sphere at one of its ends and close to the caster, wherein said contact semi-sphere bears on the surface of the blocking means when the disc is in blocked position,
  when the disc is blocked in position by engaging the crash stop and the blocking means, the crash stop is counter-blocked by a counter-stop fixed to the stand so that the stress exerted on the second axis is eliminated, said crash stop then acting as a shim between the disc and the counter-stop,
  a contactor command the motor and its rotational direction according to the orientation of the element holder,
  the motor is a motor operating in direct current generating two rotational directions, a first rotational direction for the selection of the active optical element and a second rotational direction for accurate orientation of the turret,
  the control circuit of the motor includes a diode mounted in parallel with a first resistor, a second resistor mounted in series with the assembly formed of the first resistor and of the diode, said diode short-circuiting the first resistor for the second rotational direction, so as to reduce the holding torque of the motor when the disc is blocked.

The invention also relates to a spectrometric system including an inlet slot, at least two optical elements to be selected, an outlet port and mirrors so that a light beam coming from the inlet slot is reflected on the optical element selected and directed towards the outlet port.

According to the invention, the spectrometer includes at least one device for the positioning of optical elements with retractable stop comprising the optical elements.

In a preferred embodiment, the optical elements are diffraction grids.

The invention also relates to a method for accurate positioning of an optical element selected among a plurality of optical elements carried by an element holder with which a turret capable of being driven is fitted, by a motor, rotable around a first axis so-called forward direction and in a reverse direction relative to a fixed stand, wherein the turret is also fitted with a disc forming a ratchet wheel and having a peripheral surface fitted with a plurality of blocking means, each blocking means corresponding to an optical element, comprising a first step of actuating the motor for driving the rotation of the turret in the forward direct for selecting the active optical element, a crash stop bearing against the peripheral surface of the disc then retracting by moving around a second axis, and a second step of actuating the motor for driving the rotation of the turret in the reverse direction.

According to the invention, the retractable stop moves according to the contour of the peripheral surface of the ratchet wheel without any friction.

In a preferred embodiment, when the crash stop engages between a blocking means of the peripheral surface of the disc and a counter-stop fixed to the stand, the stress exerted on the second axis is eliminated, said crash stop then acting as a shim between the disc and the counter-stop, said turret then being blocked in an accurate position.

The invention will be described in more detail with reference to the appended drawings wherein.

Figure 1:
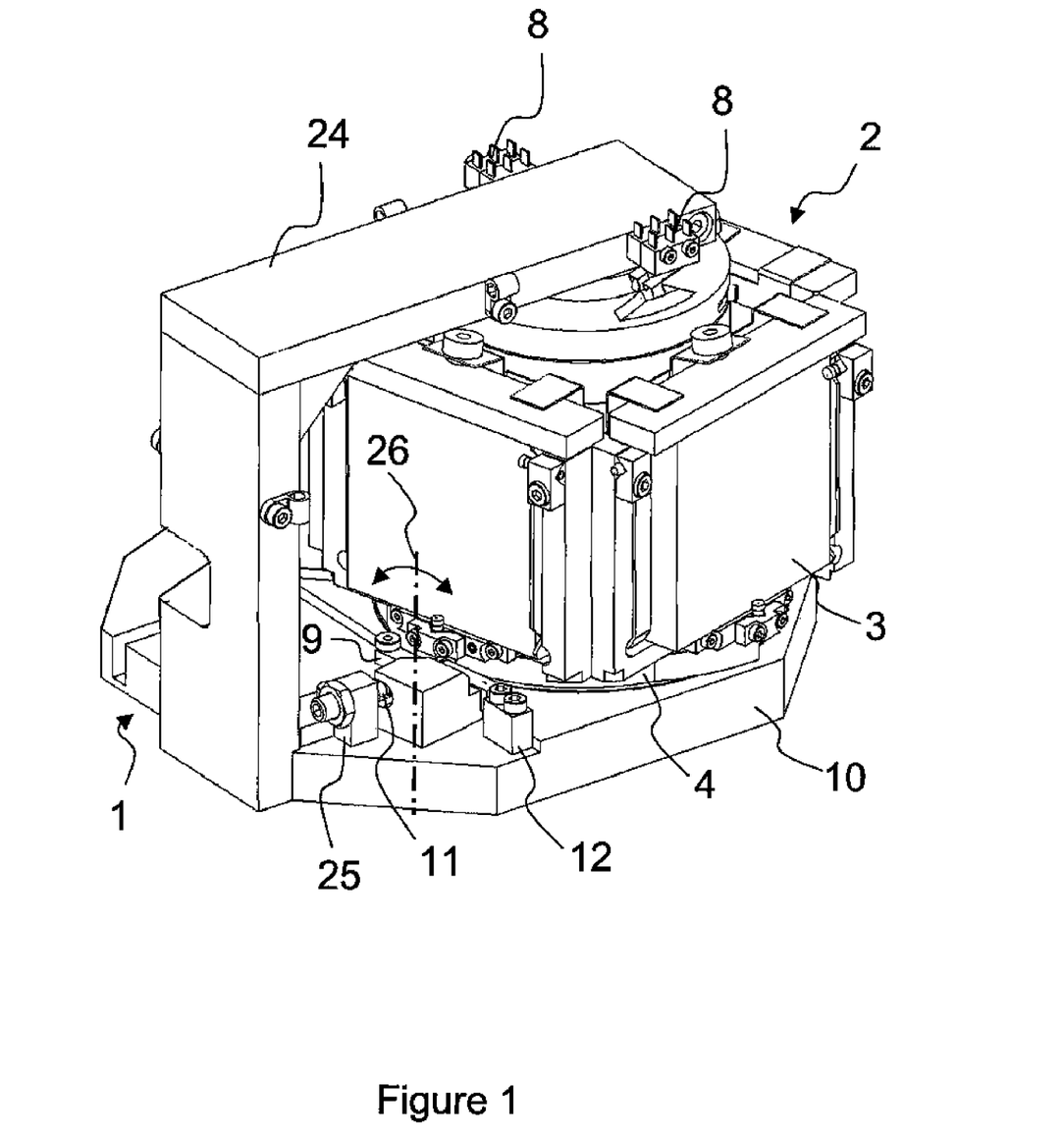
FIG. 1 is a diagrammatic representation of the invention according to a first embodiment.

FIG. 1 is a representation of the invention according to a first embodiment. It shows a device with retractable stop enabling accurate positioning of one of at least two optical elements with great accuracy. The device with retractable stop includes a stand 1 consisting of a base 10 and of an arm 24.

It also contains a turret 2 including an element holder 3 capable of supporting at least two optical elements. The turret 2 is mobile in rotation around an axis so as to position one of the selected optical elements in front of a light beam 22 so that it will be either reflected or transmitted.

On FIG. 1, the turret 2 is particularly suited to optical elements, such as diffraction grids, reflecting the light beam 22.

The device with retractable stop includes a disc 4 integral with the element holder 3. The disc 4 exhibits a peripheral surface 5 and at least two blocking means 6 on this peripheral surface. Each blocking means 6 corresponds to an optical element. On FIGS. 1 to 6, the disc 4 of the device according to the invention includes four blocking means corresponding to four optical elements 23.

Figure 2:
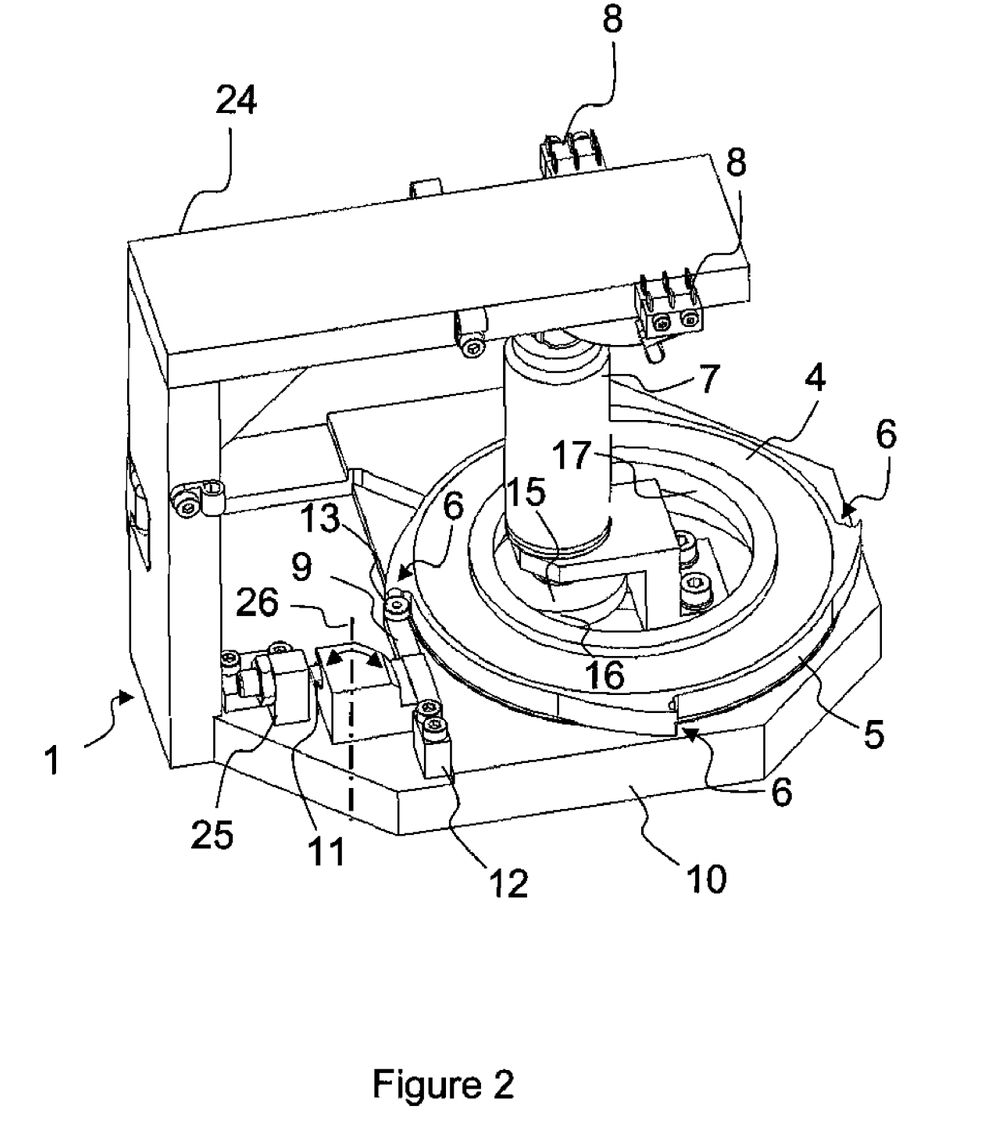
FIG. 2 is a detailed representation of the invention according to a first embodiment.

A motor 7, represented on FIG. 2, interconnected with the stand 1, drives the turret 2 relative to the stand 1. A roller 15, liable to have an external gear 16, transfers the torque from the motor 7 to the ratchet wheel 4 which contains an internal gearwork 17 in contact with the external gear 16 of the roller 15.

The motor 7 operates in direct current generating two rotational directions, a first rotational direction for the selection of the active optical element and a second rotational direction for accurate orientation of the turret 2. The accurate orientation of the turret 2 includes a blocking step described below.

A crash stop 9 of the turret is mobile, relative to the base 10, around an axis so as to form a retractable stop. The stop 9 contracts or retracts according to the contour of the peripheral surface 5 of the disc 4. The stop 9 is connected to a spring 11 fixed to an element 25 of the stand 1. This spring 11 operates by compression so as to press the stop 9 against the peripheral surface 5 of the disc 4.

The disc 4 is a ratchet wheel co-operating with the crash stop 9. The stop 9 retracts during the rotation of the disc 4 in the forward direction and blocks the disc 4 so as to position with great accuracy one of the optical elements during the rotation of the 4 in reverse direction.

The device with retractable stop includes a contactor 8 which commands the motor 7 as well its rotational direction according to the orientation of the element holder 3. According to a first embodiment of the invention represented on FIGS. 1 to 5, this contactor 8 is fixed on the upper portion of the arm 24 of the stand 1. It enables to locate the position of the optical elements relative to the stop 9.

In the forward rotational direction of the turret 2, when the stop 9 exceeds a blocking means 6 of the ratchet wheel 4, it retracts. Simultaneously, the contactor 8 command to the motor 7 a rotation of the turret 2 in reverse direction so that the stop 9 presses against the blocking means 6 of the disc 4. The disc is held blocked by the motor 7 which is still driving the turret 2 in the reverse rotational direction.

Figure 3:
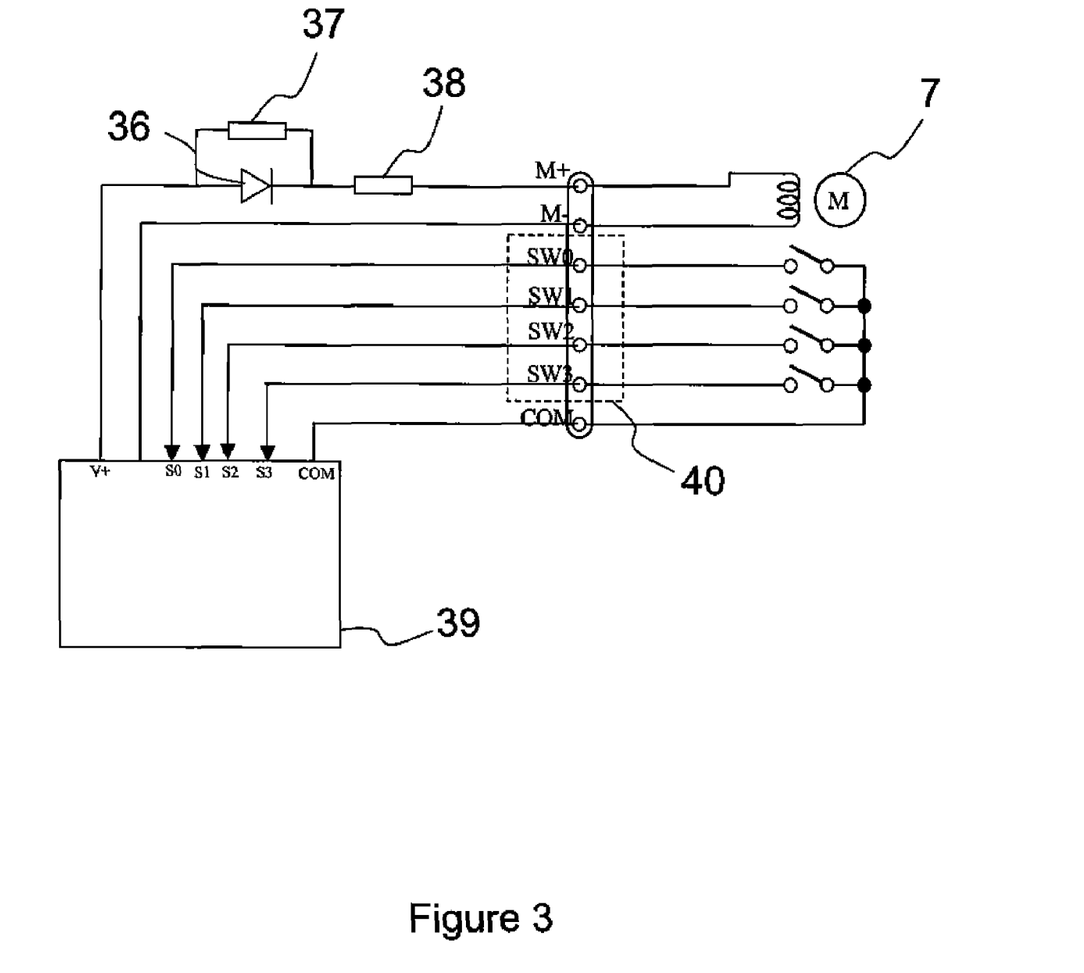
FIG. 3 is a representation of the electric diagram of the control circuit according to the invention.

FIG. 3 represents the electric diagram of the control circuit of the motor 7 including a diode 36 mounted in parallel with a first resistor 37, a second resistor 38 mounted in series with the assembly formed of the first resistor 37 and of the diode 36, a control board 39 and a set of contactors 40.

If the contactors SW0, SW1, SW2 and SW3 are open, $V_+ > V_-$, the motor 7 rotates in one direction.

If one of the contactors SW0, SW1, SW2 and SW3 is closed, $V_+ < V_-$, the motor 7 changes direction.

In the forward rotational direction (the direction enabling the changing of the optical elements) the resistor 37 is short-circuited. Only the resistor 38 enables to limit the current in the motor 7. This resistor 38 has a small value so as to reduce excessively the torque of the motor 7.

In the other rotational direction (the direction enabling the positioning against the stop), the resistors 37 and 38 in series enable to limit the current in the motor 7 and hence to decrease the holding torque of the motor 7 when the device is blocked against the stop. The value of the resistor 37 is optimised according to the holding torque desired.

The motor 7 may include a speed reducing gear.

When the turret 2 is blocked, the stop 9 is counter-blocked by a counter-stop 12 fixed to the base 10 of the stand 1. In the direction of the holding strength, there is no mechanical clearance. The counter-stop 12 holds the stop 9 and disc 4 assembly without any possible clearance. It enables to eliminate any stress exerted by the disc on the axis 26 around which the stop 9 is mobile. The disc 4 generates a load parallel to the stop 9, directed toward the counter-stop 12. Without any counter-stop 12, this load causes the deformation of the pin 26 leading to a clearance in the blocking of the turret 2. The position of the optical elements becomes less accurate. The optical elements of a spectrometer on FIG. 5 may then move during the measurements which also become less accurate and less reproducible. The re-positioning accuracy only depends on the deformation of the elements 4, 9 and 12. These elements are made of a rigid material so as to limit the deformations. The stop then acts as a shim between the disc 4 and the counter-stop 12.

Figure 4:
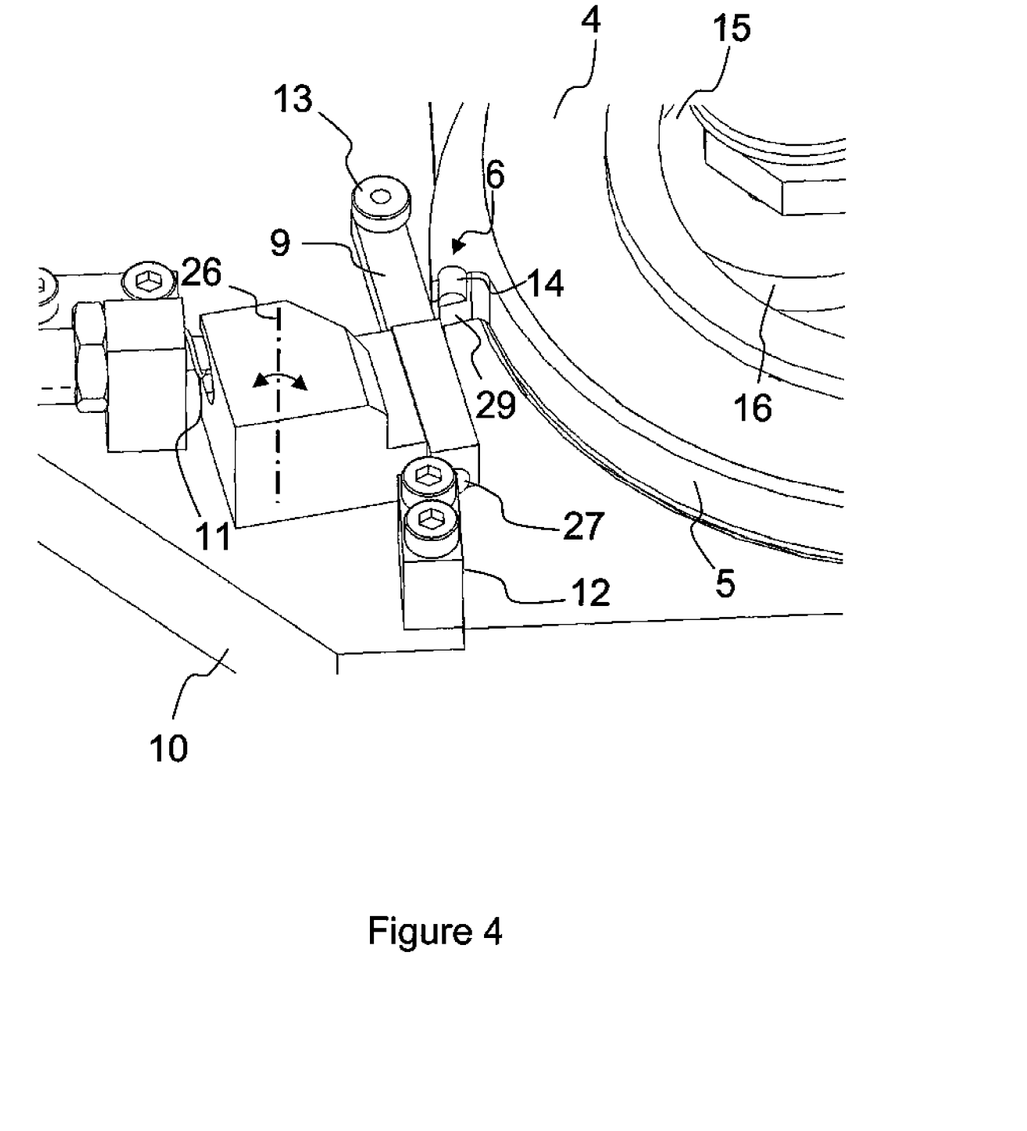
FIG. 4 is a representation of the stop according to a first embodiment of the invention.
Figure 5:
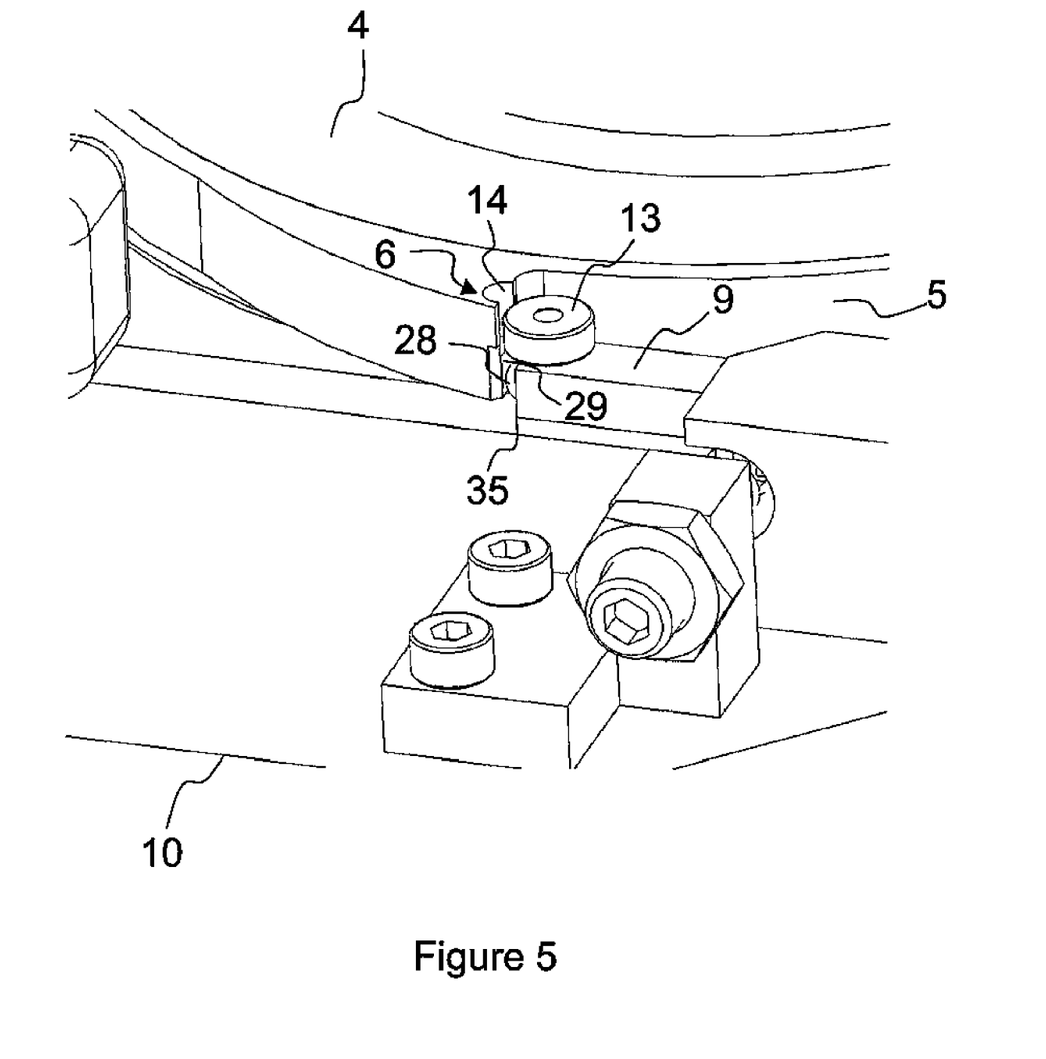
FIG. 5 is a diagrammatic representation of the invention according to a first embodiment of the invention.

FIGS. 4 and 5 show both ends of the stop 9 more in detail. Each of its ends includes on its surface a semi-sphere 27 and 28 for contacting the surface of the counter-stop and the surface 29 of the blocking means of the disc respectively.

These semi-spheres 27 and 28 are made of steel type hard material. They minimise the contact surface between the stop 9 and the surfaces whereon it bears so as to reduce the frictions. The movement of the stop 9 is more fluid. The minimisation of the frictions reduced the amount of debris or of metallic dusts on the optical elements.

The stop 9 includes an anti-friction element 13, at one of its ends, in contact with the peripheral surface 5 of the ratchet wheel so that the retractable stop 9 retracts and contracts according to the contour of the peripheral surface 5 of the ratchet wheel without any friction. In another words, the stop 9 moves according to the contour of the peripheral surface 5 du disc 4 without any friction. This also enables to reduce the amount of debris or of metallic dusts on the optical elements, to reduce the wear of the peripheral surface 5 of the disc 4 and to prevent the wear of the angles 35 of the stop.

In a preferred embodiment, the anti-friction element can be a caster 13 free to rotate around an axis.

The surfaces 29 of the blocking means 6 of the ratchet wheel include a recess 14 in the form of a semi-cylinder adapted to the shape of the caster 13. When blocking the turret 2, a portion of the caster is nested in the recess 14 so that the caster is not in contact with the surface 29 of the blocking means 6, the disc exerting a load on the stop 9. This enables to prevent the deformation of the caster 13 when blocking the turret 2.

The contact semi-sphere 28 is situated close to the caster 13 and it bears on the surface 29 of the blocking means when the disc 4 is in blocked position. The contact semi-sphere 28 can be below or above the caster 13.

The optical elements may be diffraction grids, notch filters, edge filters, mirrors, . . . .

Figure 6:
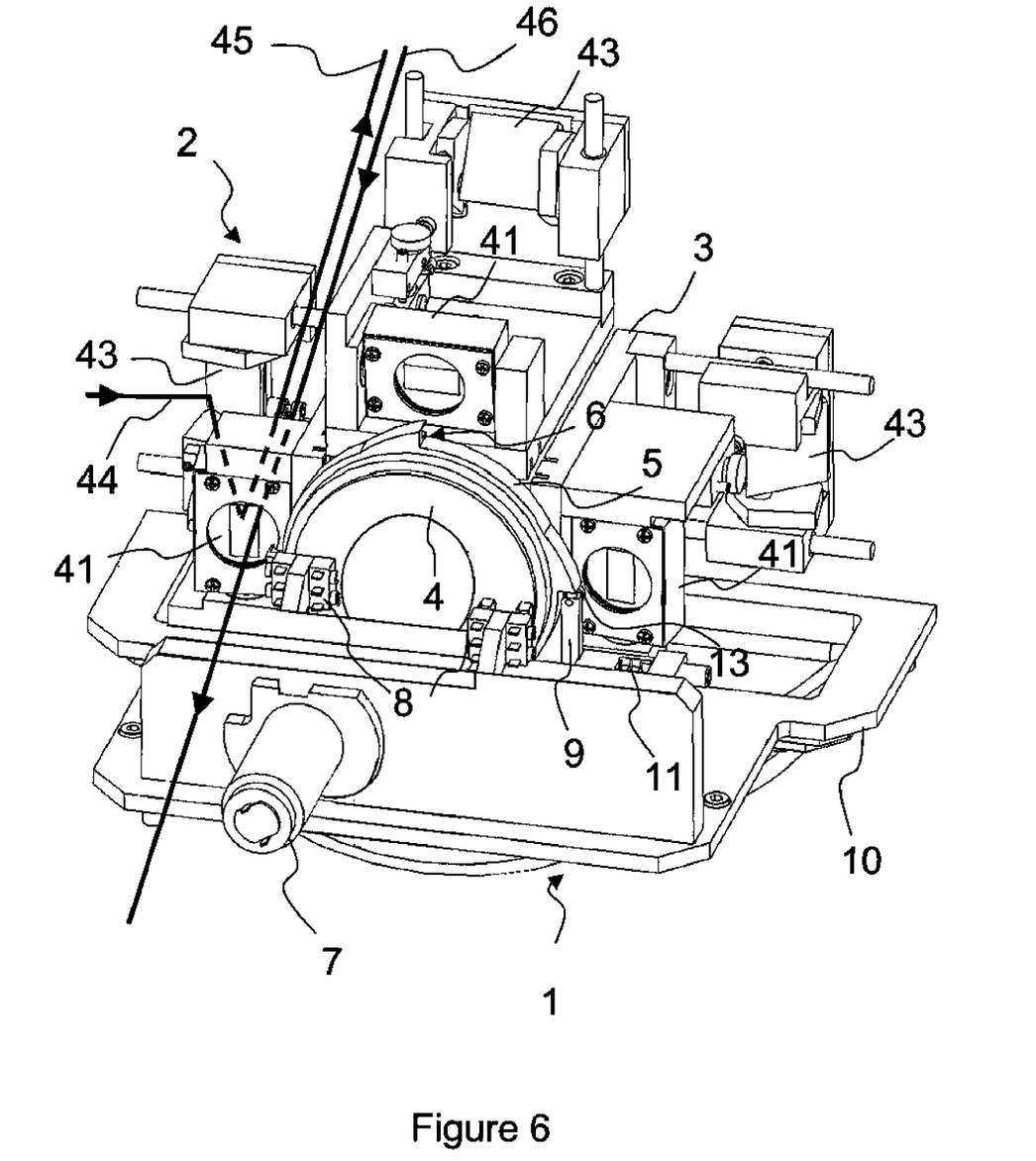
FIG. 6 is a representation of a Notch turret according to a second embodiment of the invention.

FIG. 6 represents a device for the positioning of optical elements with retractable stop for Raman Notch filter according to a second embodiment of the invention. The turret 2 is called commonly a Notch turret. FIG. 6 represents as an example a turret 2 including four Notch filters 41 associated with four mirrors 43. Only three Notch filters 41 and three mirrors 43 are visible on FIG. 6. The fourth filters and the fourth mirrors are situated beneath the base 10.

The surface of the disc 4 is perpendicular to the base 10.

When the stop 9 blocks the disc 4, a Raman Notch filter 41 and a mirror 43 are selected. These active elements are situated on the left of the disc 4.

A laser source emits a laser beam 44 which is reflected on the mirror 43 towards the Notch filter 41. This laser beam 44 is filtered in a first direction by the Notch filter 41. Only the exciting electromagnetic radiation is reflected on the filter 41. The result is an exciting beam 45, whereof the spectral band corresponds to the wavelength du exciting radiation, directed towards the sample. The undesirable complementary spectral band (Raman streak) is transmitted by the filter 41.

The exciting beam 45 illuminates the sample which transmits back an electromagnetic radiation including the characteristic spectral information of the sample and the characteristic spectral band of the Raman streak. The result is a beam 46 following a reverse direction of the exciting beam 45. A portion of this beam 46 including the characteristic spectral band of the sample is transmitted by the filter 41 towards the spectrograph. The radiation including the excitation spectral band is reflected on the filter 41.

Figure 7:
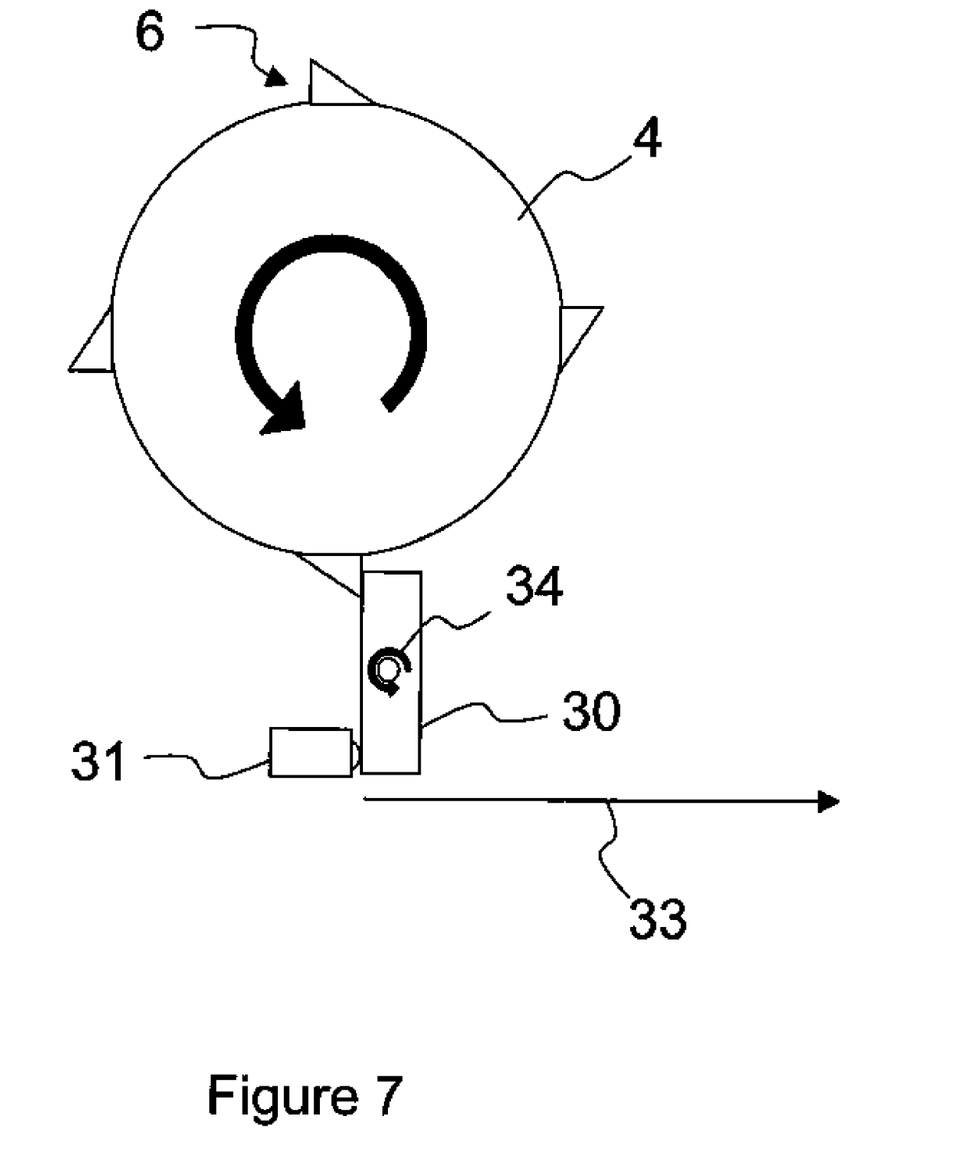
FIG. 7 is a diagrammatic representation of the invention according to a third embodiment of the invention.

FIG. 7 represents a third embodiment of the invention wherein the stop 30 and the counter-stop 31 are arranged differently.

The contactor is fixed to the base of the stand, in contact with the peripheral surface of the disc.

The crash stop 30 of the turret is mobile around an axis 34, so as to form a retractable stop.

The disc 4 is a ratchet wheel co-operating with the crash stop 30. The stop 30 retracts during the rotation of the disc 4 in the forward direction and blocks the disc 4 so as to position one of the optical elements during the rotation of the disc 4 in reverse direction.

The stop 30, counter-blocked by a counter-stop 31, blocks the disc 4. The stop 30 exerts a holding strength 33, on the counter-stop 31, perpendicular to the stop 30.

Figure 8:
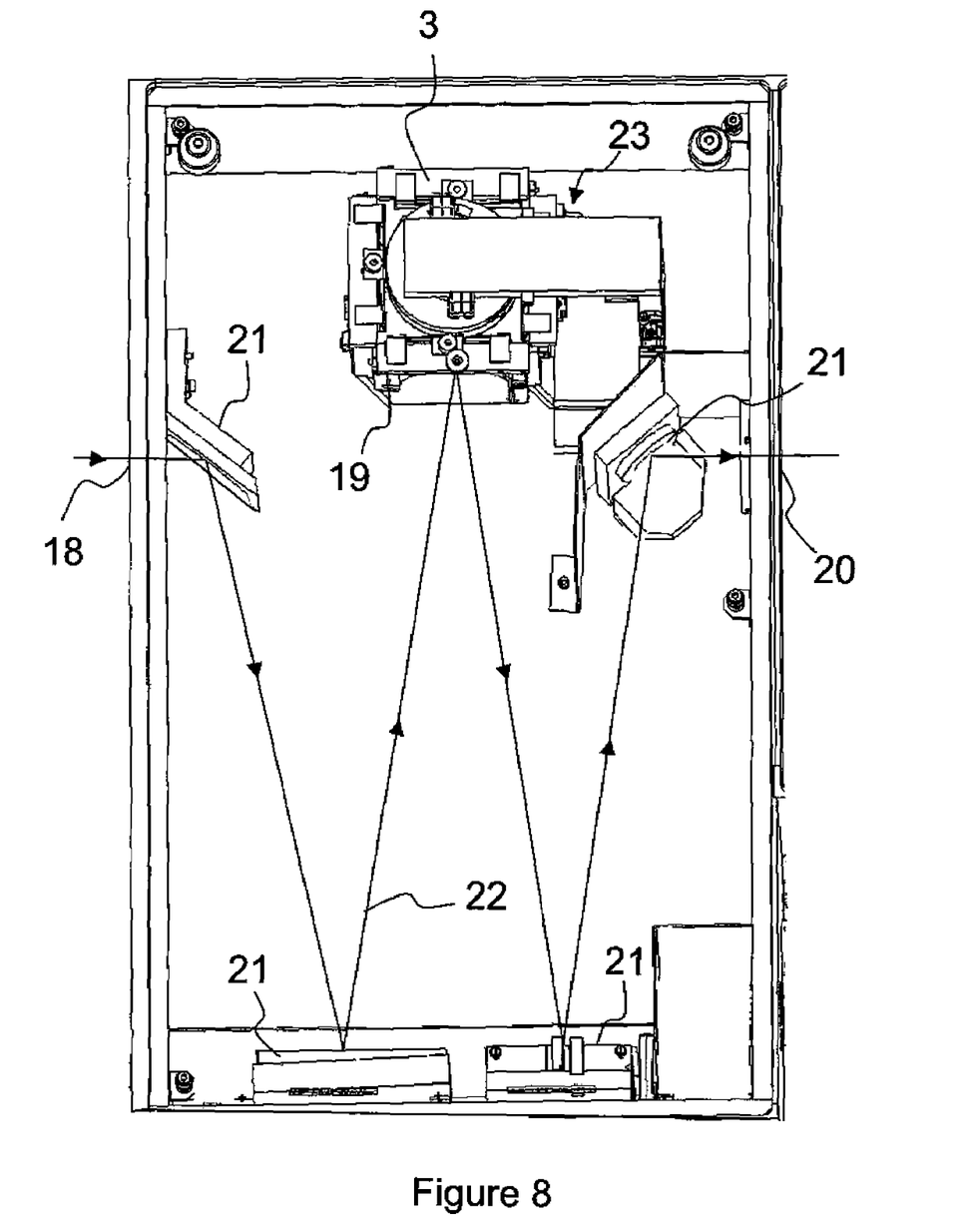
FIG. 8 is a representation of a spectrometric system for Raman spectrometer according to a first or the second embodiment of the invention.

The invention also relates to a spectrometric system represented on FIG. 8 including an inlet slot, at least two optical elements to be selected, an outlet port 18 and mirrors 21 so that a light beam 22 coming from the inlet slot 18 is reflected on the optical element 19 selected or transmitted via said selected optical element 19 then directed towards the outlet port 20.

According to the invention, it includes at least one device with retractable stop 23 comprising the optical elements.

The device with retractable stop 23 enables to select an optical element 19 of at least two elements of the turret 3.

The device with retractable stop 23 can be used in spectrometric system of Raman type spectrometers or other spectrometers requiring great accuracy for the orientation of the elements. These elements may be opto-mechanical elements.

Thus, the device with retractable stop according to the invention provides an automatic and very accurate re-positioning of the optical elements selected without any possible clearance (very stable). The members forming the device are not so stressed by the friction and wear out more slowly. The lifetime of the device is increased and the optical elements of the spectrometric system are less contaminated by the dusts or the like due to wear.

The invention claimed is:

1. A device for the positioning of optical elements with retractable stop enabling accurate positioning of an optical element selected among a plurality of optical elements, including:
   a stand (1);
   a turret (2) fitted with an element holder (3) carrying said plurality of optical elements, and with a disc (4) integral with the element holder (3), said disc (4) being a ratchet wheel having a peripheral surface (5) fitted with a plurality of blocking means (6), each blocking means (6) corresponding to an optical element,
   a motor (7) capable of driving said disc (4) in rotation relative to said stand (1) around a first axis in a so-called forward direction and in a reverse direction; and,
   a crash stop (9) bearing against the peripheral surface of the disc (5) and capable of retracting by moving around a second axis when actuating said motor (7) for driving the disc (4) in the forward direction, said crash stop (9) being capable of engaging with a blocking means (6) so as to block said disc (4) in position when actuating the motor (7) for driving the disc (4) in the opposite direction,
   characterised in that the crash stop (9) contains an anti-friction element (13) in contact with the peripheral surface (5) of the ratchet wheel so that the retractable stop (9) moves according to the contour of the peripheral surface (5) of the ratchet wheel without any friction.

2. A device for the positioning of optical elements with retractable stop according to claim 1, characterised in that the anti-friction element is a caster (13) free to rotate around an axis.

3. A device for the positioning of optical elements with retractable stop according to claim 2, characterised in that the blocking means (6) of the ratchet wheel include a recess (14) in the form of a semi-cylinder, capable of enabling the nesting of said caster (13) into said recess (14) when the disc (4) is in blocked position.

4. A device for the positioning of optical elements with retractable stop according to claim 1, characterised in that the crash stop (9) includes a contact semi-sphere (28) at one of its ends and close to the caster (13), wherein said contact semi-sphere (28) bears on the surface (29) of the blocking means when the disc (4) is in blocked position.

5. A device for the positioning of optical elements with retractable stop according to claim 1, characterised in that when the disc (4) is blocked in position by engaging the crash stop (9) and the blocking means (6), said crash stop (9) is counter-blocked by a counter-stop (12) fixed to the stand (1) so that the stress exerted on the second axis is eliminated, said crash stop (9) then acting as a shim between the disc (4) and the counter-stop (12).

6. A device for the positioning of optical elements with retractable stop according to claim 1, characterised in that a contactor (8) commands the motor (7) and its rotational direction according to the orientation of the element holder (3).

7. A device for the positioning of optical elements with retractable stop according to claim 6, characterised in that the motor (7) is a motor operating in direct current generating two rotational directions, a first rotational direction for the selection of the active optical element and a second rotational direction for accurate orientation of the turret (2).

8. A device for the positioning of optical elements with retractable stop according to claim 7, characterised in that the control circuit of the motor includes a diode (36) mounted in parallel with a first resistance (37), a second resistor (38) mounted in series with the assembly formed of the first resistance (37) and of the diode (36), said diode (36) short-circuiting the first resistor (37) for the second rotational direction, so as to reduce the holding torque of the motor (7) when the disc (4) is blocked.

9. A spectrometric system including an inlet slot, at least two optical elements to be selected, an outlet port (18) and mirrors (21) so that a light beam (22) from the inlet slot (18) is reflected on the optical element selected (19) and directed toward the outlet port (20), characterised in that it includes at least one device for the positioning of optical elements with retractable stop according to claim 1.

10. A spectrometer according to claim 9, characterised in that the optical elements are diffraction grids.

11. A method for accurate positioning of an optical element selected among a plurality of optical elements carried by an element bolder with which a turret capable of being driven is provided, by a motor (7), rotatable around a first axis in a so-called forward direction and in a reverse direction relative to a fixed stand, wherein the turret is also fitted with a disc forming a ratchet wheel and having a peripheral surface (5) fitted with a plurality of blocking means (6), each blocking means (6) corresponding to an optical element, comprising a first step of actuating the motor for driving the rotation of the turret in the forward direction for selecting the active optical element, a crash stop (9) bearing against the peripheral surface of the disc then retracting by moving around a second axis, and a second step of actuating the motor for driving the rotation of the turret in the reverse direction, characterised in that the retractable stop (9) moves according to the contour of the peripheral surface (5) of the ratchet wheel without any friction.

12. A method for accurate positioning of an optical element according to claim 11, characterised in that when the crash stop engages between a blocking means (6) bearing against the peripheral surface of the disc and a counter-stop (12) fixed to the stand, the stress exerted on the second axis is eliminated, said crash stop (9) then acting as a shim between the disc (4) and the counter-stop (12), said turret then being blocked in an accurate position.

* * * * *